United States Patent [19]
Klein et al.

[11] Patent Number: 5,689,067
[45] Date of Patent: Nov. 18, 1997

[54] DIAGNOSTIC METHOD AND APPARATUS FOR MONITORING THE WEAR OF AT LEAST AN ENGINE TIMING CHAIN

[75] Inventors: Siegfried Klein; Bernd Rehfus, both of Esslingen, Germany

[73] Assignee: Daimler-Benz AG, Germany

[21] Appl. No.: 591,403

[22] Filed: Jan. 25, 1996

[30] Foreign Application Priority Data

Feb. 3, 1995 [DE] Germany ................. 195 03 457.0

[51] Int. Cl.$^6$ ...................... G01M 15/00; G01M 13/02; G01B 7/02; B60K 35/00
[52] U.S. Cl. .................. 73/118.1; 73/116; 73/117.3; 123/90.17; 340/438; 364/431.03
[58] Field of Search ................. 73/866.1, 866.2, 73/865.9, 9, 115, 116, 117.2, 117.3, 118.1; 123/90.17; 340/438, 439; 364/431.03

[56] References Cited

U.S. PATENT DOCUMENTS

| | | | |
|---|---|---|---|
| 3,385,096 | 5/1968 | Adams | 73/9 |
| 3,688,557 | 9/1972 | Marinus | 73/9 |
| 4,068,394 | 1/1978 | Sanna et al. | 73/9 |
| 4,373,480 | 2/1983 | Shikata et al. | 123/195 A |
| 4,575,367 | 3/1986 | Karmel | 73/9 |
| 4,940,447 | 7/1990 | Kawashima et al. | 474/110 |
| 5,307,672 | 5/1994 | Macchiarulo et al. | 73/118.1 |
| 5,463,898 | 11/1995 | Blander et al. | 73/116 |
| 5,548,995 | 8/1996 | Clinton et al. | 73/116 |

FOREIGN PATENT DOCUMENTS

| | | |
|---|---|---|
| 33 08 044 | 9/1984 | Germany . |
| 33 37979 | 9/1985 | Germany . |
| 35 24 338 | 1/1987 | Germany . |
| 43 34 148 | 4/1994 | Germany . |

OTHER PUBLICATIONS

Patent Abstract of Japan, vol. 8, No. 270 (M–344) [1707] Dec. 11, 1984, for JP 59–140954 dated Aug. 13, 1994.
Patent Abstract of Japan, vol. 12, No. 428 (M–762) [3275] Nov. 11, 1988 for JP 63–162940 dated Jul. 6, 1988.
"Ein neues Verfahren zur Messung und Bewertung der dynamischen Positionsdifferenz in rotierenden Systemen", Von Dirk Heintzen et al., MTZ 54 (1993) No. 4, pp. 184–189.
European Search Report dated Apr. 30, 1996.

*Primary Examiner*—George M. Dombroske
*Attorney, Agent, or Firm*—Evenson, McKeown, Edwards & Lenahan P.L.L.C.

[57] ABSTRACT

The invention relates to a method and apparatus for monitoring wear of an engine timing chain. During engine operation, the relative phase relation of the signals of two engine-integrated on-board sensors which detect the angular position of different chain sprockets with respect to one another and are situated on different chain sprockets of the timing chain drive, is determined, and is then compared with a predetermined desired value. If the current actual phase relation differs from the desired value, a signal is emitted which reports an unacceptable lengthening of the timing chain. In addition to the sensors, the diagnostic device contains a signal processing unit which, detects the phase relation of the received sensor signals with respect to one another and performs a desired value comparison with respect to the phase relation. If the phase relation deviates from the predetermined desired value, a signal generator emits a signal reporting a lengthening of the timing chain.

30 Claims, 3 Drawing Sheets

DIAGNOSTIC METHOD AND APPARATUS FOR MONITORING THE WEAR OF AT LEAST AN ENGINE TIMING CHAIN

BACKGROUND AND SUMMARY OF THE INVENTION

This invention relates to a method and apparatus for determining the wear of an engine timing chain by comparing monitored diagnostic signals with predetermined desired values.

A diagnostic method and apparatus of this type are disclosed in German Patent Document DE-PS 33 37 979, in which a measuring shoe is arranged externally adjacent a chain sprocket, and is radially movable with respect thereto. The chain studs slide along the sole of the measuring shoe while the chain moves through, and the measuring shoe thus exerts a slight touching on the studs. When a single chain link is damaged, the chain is lengthened, so that during the engagement into the teeth of the chain sprocket, the chain stud is deflected radially out of the tooth gap, pressing the measuring shoe slightly to the outside for a short time period. The measuring shoe is connected with a path generator that senses all such radial deflections and transmits electric measurement signals indicative thereof, for processing in a microprocessing where they are compared with a predetermined desired value corresponding to a wear limit. When the desired value is exceeded, an unacceptable wear of the timing chain is indicated.

The known method or the known diagnostic device, however, can be used only in a workshop for servicing or for scientific research, because the measuring shoe is arranged only temporarily; that is, for the period during which the wear is measured. In addition, the measuring shoe, which is used as the wear sensor, can be placed only externally. Furthermore, because of the narrow spaces in the engine compartment of a motor vehicle and possibly because of the encapsulation of the engine, the engine must be removed to install the measuring shoe, which represents considerable servicing expenditures. Under certain circumstances, such expenses may prove unnecessary if it is found after the measurement that the timing chain is not unacceptably worn. On the other hand, wear during the servicing interval may already be so high that the timing chain tears during the driving operation of the motor vehicle, causing irreparable engine damage. These obviously undesirable developments cannot be avoided by means of the known diagnostic method and apparatus.

It is thus an object of the invention to provide a diagnostic device which can detect unacceptable wear of the timing chain during the driving operation - and at the lowest possible expenses.

According to the invention, this object is achieved by providing an engine integrated, on-board sensor on each of at lest two respective spaced apart chain sprockets in the chain drive, with at least one marker on each such sprocket. The markers and the pertaining sensors generate a signal at least once per rotation of each chain sprocket, such signal representing the angular position of the sprocket. The phase relation of the latter signals relative to one another is determined. A change of this phase relation relative to a new perfect (that is, unworn) chain thus indicates the degree or amount of the wear. When the phase relation deviates from a defined, predetermined desired value, an unacceptable wear is recognized which may be indicated in the passenger compartment, for example, as a flashing of a control light.

By means of the phase relation detection of two signals of different chain sprockets according to the invention, a diagnostic method and apparatus can be implemented in a simple manner by means of which wear of the timing chain can be detected at low expenditures at any time and/or continuously. Thus, unacceptably high wear of the timing chain with respect to a uniform lengthening of the chain and a lengthening because of damage to an individual chain link can be timely recognized automatically and individually during the engine operation, and an unnecessary precautionary chain replacement can be avoided. The timing chain is changed only when it is really necessary, before the risk arises that an expensive or even irreparable damage to the engine may occur due to breakage of the timing chain. Possibly unnecessary servicing costs and time are thus avoided, routine servicing is reduced and costs are lowered correspondingly without any loss of operating safety.

Other objects, advantages and novel features of the present invention will become apparent from the following detailed description of the invention when considered in conjunction with the accompanying drawings.

DETAILED DESCRIPTION OF THE DRAWINGS

Figure 1:
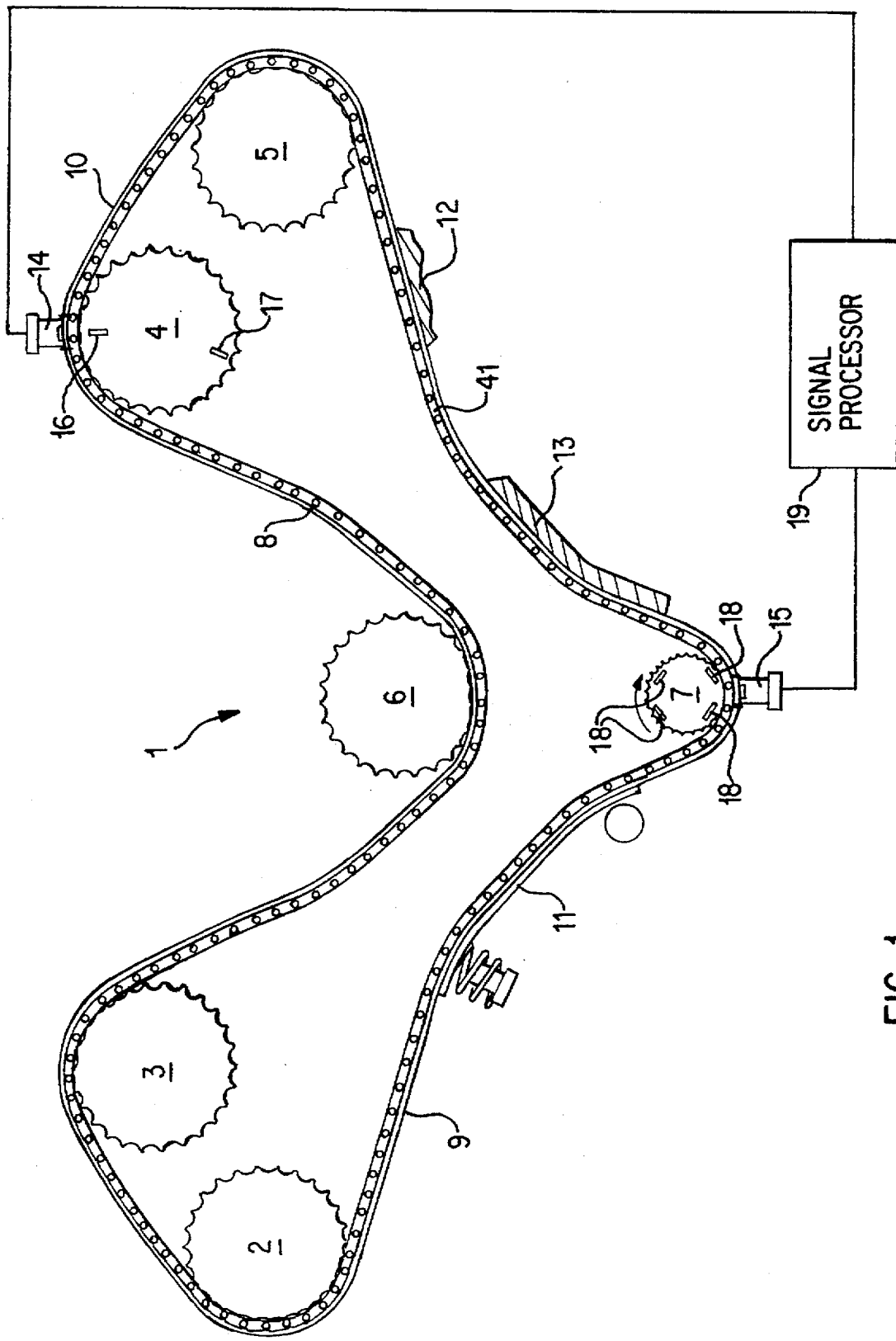
FIG. 1 shows a chain drive of an engine timing chain, with the sensors of the diagnostic device according to the invention.

In FIG. 1, reference number 1 indicates a chain drive for the engine timing of a motor vehicle engine, with four mutually spaced chain sprockets 2, 3, 4, 5 which are arranged on camshafts, a guide wheel 6, a chain sprocket 7 (which drives the other chain sprockets 2, 3, 4, 5) arranged on the crankshaft of the motor vehicle, and a timing chain 8 which engages into teeth of the chain sprockets 2, 3, 4, 5, 6, and 7.

The chain sprocket 7 of the crankshaft is situated at the lowest point (relative to the vehicle supporting surface) of all the chain sprockets. The timing chain 8 runs in the pulling direction by way of the chain sprockets 2 and 3, then by way of the guide wheel 6, and finally by way of the sprocket wheels 4 and 5, returning to the sprocket wheel 7. The chain sprockets 3 and 4 are situated at the highest point in the chain drive 1, while the chain sprockets 2 and 5 are laterally offset to the outside relative to the chain sprockets 3 and 4 and are arranged slightly lower. The guide wheel 6, in turn, is arranged lower than the chain sprockets 2, 3, 4, 5 and is geometrically arranged such that a line connecting its center and the center of the chain sprocket 7 of the crankshaft forms a mirror-symmetrical axis of the chain drive 1.

Section 9 of the timing chain 8, between the lowest point of the periphery of the chain sprocket 7 and the highest point of the periphery of the chain sprocket 4, on which section the guide wheel 6 is disposed, forms the trailing end, while section 10 of the chain, between the highest point of the periphery of the chain sprocket 4 and the lowest point of the periphery of the chain sprocket 7, on which section the chain sprocket 5 is disposed, forms the pulling end.

A conventional chain adjuster 11 is situated on the trailing end between the chain sprocket 2 and the chain sprocket 7. To avoid rolling motions, the timing chain 8 is guided on the pulling end along two guide rails 12, 13 situated between chain sprocket 7 and chain sprocket 5.

Sensors 14 and 15 are arranged respectively in a spaced manner opposite the highest point of the periphery of the chain sprocket 4 and opposite the lowest point of the periphery of the chain sprocket 7. These sensors 14, 15 are part of a diagnostic device for monitoring the wear of the timing chain 8 with respect to its lengthening. Sensor 14 interacts with two markers 16, 17 on chain sprocket 4 and sensor 15 interacts with four markers 18 on the front side of the chain sprocket 7.

The markers 16, 17 and 18, which are situated near the periphery of the chain sprockets 4 and 7, are offset with respect to one another by a defined angle of rotation. They may comprise, for example, small magnetic disks or magnetic pins which interact inductively with the sensors 14 and 15 in a signal triggering manner. In a simpler arrangement, the markers 16, 17 and 18 may also be constructed as elevations or indentations in the respective faces of the chain sprockets 4 and 7, which change only the air gap toward the respective sensor, with a resulting inductive effect. For triggering signals which are regularly repeated for each rotation of the chain sprocket 4, 7, the Hall effect may also be used. Alternatively, markers are also conceivable which can be detected optically for each chain sprocket rotation.

In a space saving and reasonably priced embodiment of the diagnostic device, the sensors 14 and 15 are formed by position transmitters which already exist on the engine, and which detect the respective position of the crankshaft and of the camshafts, so that by way of a signal processing electronic system 19 connected with the sensors, the ignition points as well as the valve opening times and valve closing times are controlled.

Figure 2:
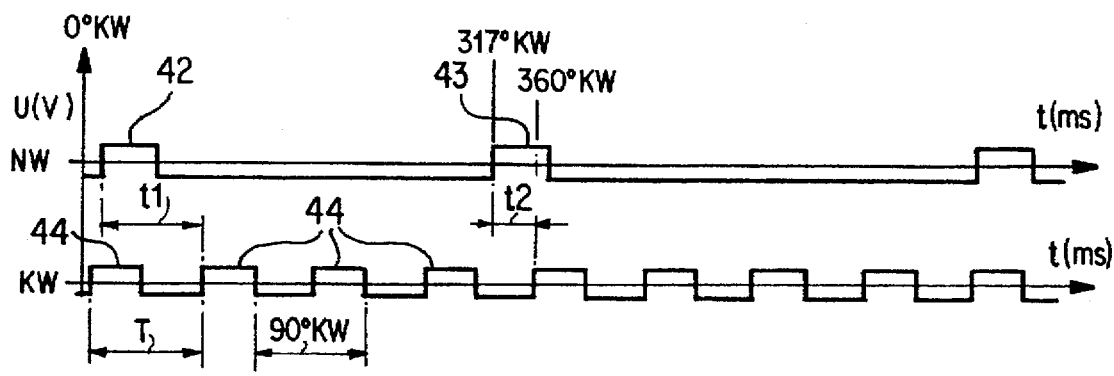
FIG. 2 is a graphic depiction of the signal sequence of the sensors from FIG. 1.

During engine operation, the chain sprockets 2, 3, 4, 5, 6 are driven by tooth engagement with the chain 8, which in turn is driven by chain sprocket 7 by way of the crankshaft. Each time one of the markers 16, 17 or 18 traverses the corresponding sensor 14 or 15, a voltage signal 42, 43, 44 is generated. The generated voltage signals 42, 43, 44, for the chain sprockets 4, 7 of the camshaft (NW) and of the crankshaft (KW) illustrated in FIG. 2, are received by a signal processing device 40 of the engine controlling electronic system 19 (FIG. 1) separately on two different channels. After a crank angle of 360°, four signals 44 (corresponding to the four marks 18) are detected on the channel for the signals of the crankshaft chain sprocket 7, and two signals 42, 43 (corresponding to marks 16, 17) are detected on the channel for the signals of the camshaft chain sprocket 4.

Figure 4:
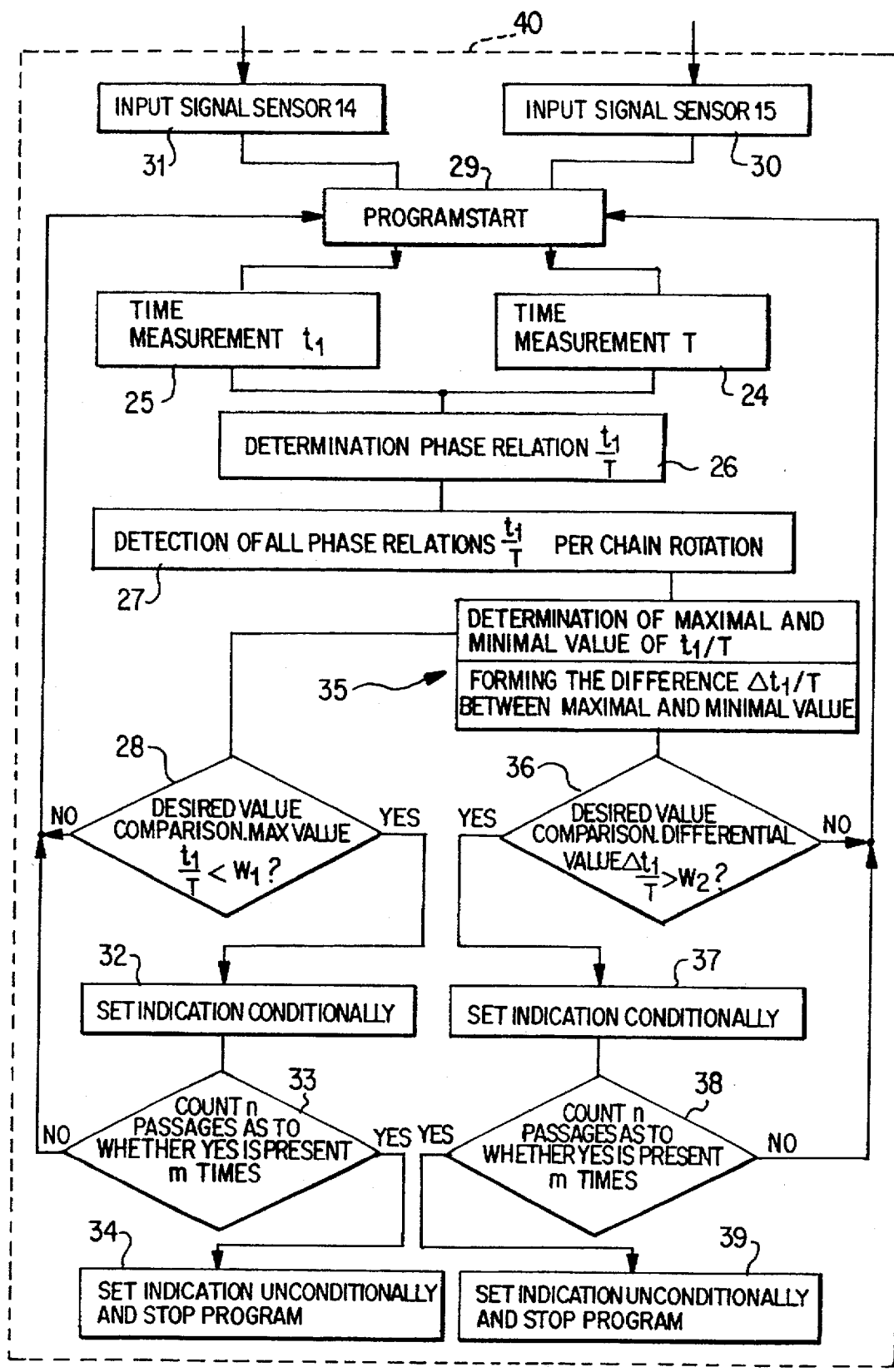
FIG. 4 is a flow chart of the method of operation of the diagnostic device.

Therefore, the signal processing 40 is a part of the diagnostic device. According to the diagnostic flow chart of FIG. 4, the diagnostic program start 29 occurs after each arrival of a signal 42, 43 from one of the two sensors 14, 15, unless the program has already been stopped by the detection of an unacceptable wear and a wear indication is activated. After the arrival of a signal 44 in the signal receiving device 30 connected with the sensor 15 in the channel set up for the signals of chain sprocket 7, a time measurement is started in function module 24, to determine the period duration T of the respective received signal 44.

Approximately simultaneously, after the arrival in the signal receiving device 31 connected with the sensor 14, of a signal 42 assigned to the marker 16 of chain sprocket 4, a further time measurement takes place in the function module 25 to determine the time $t_1$ until the arrival of the signal 44, which follows next in time and corresponds to the marker 18 of the sprocket wheel 7. The points in time of the start and of the end of this measurement, which is continuously repeated if the timing chain 8 is not unacceptably worn, are in each case situated on the ascending flanks of the signals 42 and 44 of chain sprockets 4 and 7, respectively.

With each arrival of a signal 43 assigned to the further marker 17, additional time measurements $t_2$ take place in the function module 25 starting with the leading edge of the signal 43 and ending with the leading edge of the next succeeding signal 44. The time $t_2$, may differ from $t_1$. (See FIG. 2.)

The time periods $t_1$, $t_2$ represent a measurement for the phase relation of the signal 42, 43 of chain sprocket 4 of the camshaft on the one hand, relative to signal 44 of chain sprocket 7 of the crankshaft on the other. After the time measurements in function modules 24, 25, the phase relation of the signals 42, 43 is determined in the function module 26 of the signal processing 40 independently of the rotational engine speed, as a ratio of the times $t_1/T$ and $t_2/T$. In this regard, it must be observed that the time periods $t_1$, $t_2$ are situated in chronologically different time periods T, whose period duration may differ due to variations in the rotation speed of the crankshaft. A defined period duration T, which is valid only for the specific time period, is therefore assigned to each time period $t_1$, $t_2$. In the function module 27, all values of the phase relations $t_1/T$ and $t_2/T$ are now detected for each chain circulation. A function module 35 then determines the maximum and minimum values from the sequence of values of the phase relations $t_1/T$ during chain circulation, and calculates the difference $\Delta\, t_1/T$ between these extreme values. In the case of different engines, and therefore different chain drive geometries and conceptions, the detection of the values of all phase relations may extend from one chain circulation to several chain circulations.

If wear on the timing chain 8 causes it to lengthen, the pulling moment of the driving chain sprocket 7 onto the chain sprocket 4 during the entering of the lengthened section of the chain 8 into the section of the pulling end becomes momentarily smaller. This has the result that the driven chain sprocket 4 runs more slowly than during the passing through of an unlengthened chain section until the required tightness of the pulling end is restored. The markers 16 and 17 which, because of the slower running of the chain sprocket 4 relative to the chain sprocket 7 are displaced backward in the rotating direction (that is, delayed) by an angle of rotation, therefore travel past the sensor 14 slightly later, in a time staggered manner so that the point in time of the arrival of the signal 42, 43 is delayed. However, this is expressed in a shortening of the time $t_1$ and $t_2$, in which case the phase relation of the signals 42, 43 is displaced toward the smaller degree of the crank angle.

The new phase relation of the signals 42, 43 will last until the lengthened chain section has moved out of the pulling end into the trailing end. At this point, the slowed down chain sprocket 4 will run faster again until the normal movement of the chain 8 is achieved. In this case, the markers 16, 17 move to their original relative position, the times $t_1$ and $t_2$ being longer again. Thus the signals 42, 43, return to their original phase relation with respect to one another toward the higher degree of the crank angle.

If the timing chain 8 is uniformly lengthened along its whole circumference, no return of the markers 16, 17 into their original relative position takes place, and a continuous displacement of the phase relation of the signals will take place during the useful life of the timing chain 8.

Figure 3:
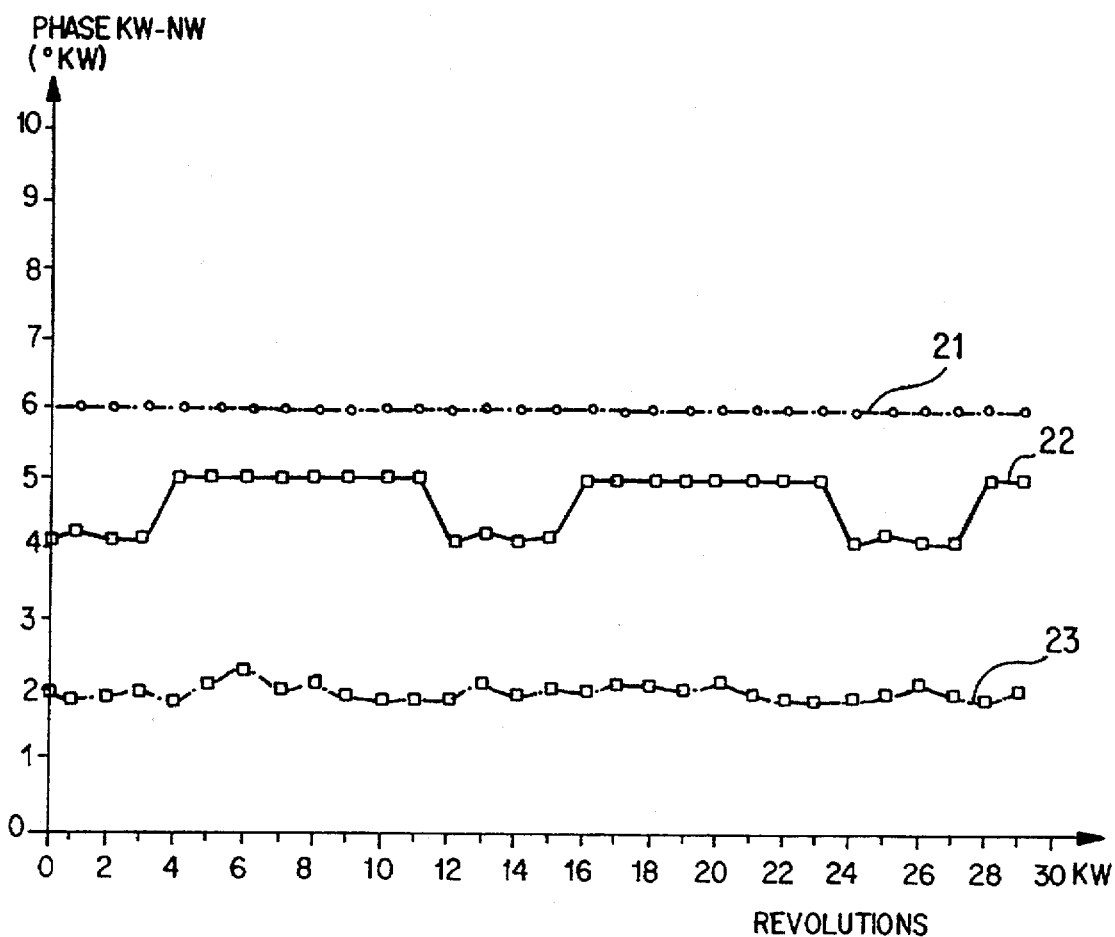
FIG. 3 is a phase—crankshaft rotation diagram which shows the phase relation of the signals of the sensors from FIG. 1 with respect to one another in different wear conditions of the timing chain.

In the case of the above-described restoration of the phase relation, there is wear of a chain section or damage to an individual chain link. This is shown, for example, in FIG. 3, in which the phase relation during crankshaft rotation of a theoretically ideal chain 8, which is in an optimal condition, is depicted in a linear curve 21 for more than two chain passages.

In the real condition, the total chain 8 is slightly, but acceptably lengthened, so that $t_1$ and $t_2$ become slightly shorter, and there is therefore a slight phase relation difference of the signals 42, 43 in comparison to the ideal chain. In the case of an additional individual link damage, the above-described jumping characteristic of the phase relation will occur in the curve 22 (a chain sprocket 4 without any marker 17 is used as a basis in this case). In this case, the faulty chain link 41—with respect to time—is within the pulling end for four crankshaft rotations, that is, at four measuring points. The curve 23 discloses the course of the phase relation of the signals 42 in the case of an extremely lengthened timing chain 8, without any individual link damage; in this case, the phases of signals 42 and of signals 44 are displaced with respect to one another up to a crank angle of approximately 2°.

For the active monitoring of the wear of the timing chain 8, a comparison is made in function module 28 between a maximal value $t_1/T$ and a predetermined stored desired value $W_1$. If the desired value is larger than the maximal value, it can be concluded then an unacceptable wear in the form of a total uniform chain lengthening has occurred.

The function module 28 then emits a signal to another function module 32 which generates an indication in the passenger compartment by way of a signal generator which can be clearly recognized by the occupant. The function module 32 emits a signal to a function module 33 which, to avoid false indications as a result of a signal error, counts n-passages (that is n desired value comparisons) and examines whether the above indication of an unacceptable wear is present at a sufficient frequency (m times). If so, a signal is emitted to a function module 34 which unconditionally sets the indication by way of the signal generator and stops the measuring program. The indication may, for example, be an acoustic signal or the flashing of a small light in the dashboard.

If the maximal value of $t_1/T$ corresponds to the desired value or if the indication of wear is recorded with an insufficient frequency (less than m-times), the indication remains inactive and the program is restarted.

In parallel to the desired value comparison in the function module 28, the differential value $\Delta T_1/T$ is compared with a desired value $W_2$ in a function module 36. If the differential value is larger than the desired value $W_2$, a signal is emitted to a function module 37 which, similar to function module 32, generates an indication in the passenger compartment by way of a signal generator which is to report an individual-link damage on the timing chain 8. For the same purpose as that of the function module 33, a function module 38 counts n-passages of the formation of a difference, and it determines whether the differential value which is larger than the desired value $W_2$ exists m times. If so, a signal is emitted to a function module 39 which by way of the signal generator unconditionally sets the indication and stops the measuring program.

If the desired value $W_2$ was found to be larger or the differential value was found to be less than—as predetermined—m times, the indication remains inactive and the program is restarted. Although the indication of the individual-link damage is arranged at a different point than the indication of the uniform lengthening of the timing chain 8, it may be identical to it with respect to the type and construction. As a result of its design, the described diagnostic device is self-diagnosing.

In addition, it is conceivable to provide a "reset" in the program after an indication has taken place, which resets the respective indication after a wear has been announced. Furthermore, it is conceivable to design the program such that, after the indication of one of the wear possibilities has taken place, the program continues only to the extent necessary to indicate the respective other type of unacceptable wear which has yet not occurred, and has therefore not yet been indicated, when it does occur later. As an alternative to indicating the wear-detecting signal, this signal may also simply be stored in an electronic memory which, during a later servicing operation, is called up by the servicing personnel. In this case, the servicing personnel are able to assess the condition of the engine timing chain 8 in a simple manner and at low expenditures and to exchange the chain 8 if the wear is excessive.

On the whole, by means of the diagnostic device or because of the method, signals are obtained which are easy to analyze and have no superimposed signal noise. Also, processing of the signals is simplified by a mere short time measurement between, for example, two defined time markers, and by a mere forming of the difference of the values resulting from the short time measurement.

When a damaged individual link 41 enters into the pulling end, individual-link wear can as a rule be recognized only when the individual link 41 is situated on the free course between the chain sprockets. When the chain runs on the pulling course along another chain sprocket, the damaged individual link 41 is pressed into its teeth during the passage, in which case the lengthening is compensated so that, at this moment, a situation occurs for the individual link 41 which equals the running out of the pulling end. At this moment, wear cannot be identified by a measurement because, for a short time, the chain sprockets 4 and 5 rotate faster and thus the markers 16, 17 take up their original position which corresponds to an unworn chain 8 without any individual-link damage.

In order to obtain a high probability of finding such a wear, it is advantageous in this case to arrange as few chain sprockets as possible on the course of the pulled end between the chain sprocket 4 and the chain sprocket wheel 7. The reason is that, if the defective chain link 41 is on a free course, the length of the chain 8 is determined by the sum of the length of the individual links; however, on the chain sprocket, it is determined by the pitch of its toothing, which renders the chain defect ineffective for a measurement.

In order to detect this chain defect at all, if possible, the number of links in the pulled end between the two directly adjacent chain sprockets should be larger than the tooth number of the driven sprocket because the defective link is definitely at least once per chain rotation on a free course of the pulled end. In this case, the tooth number is defined as the number of teeth of the driven sprocket which are situated between two measuring points or the pertaining markers on the chain sprocket.

Should the number of links be smaller than the tooth number and, in the case of an even numbered ratio of the tooth number of the chain sprocket to the number of all links of the timing chain 8, it is conceivable that the defective link may not be detected during a measurement because there is always at least one chain link which, at the point in time of the measurement during each chain circulation is outside the free course on which the measurement takes place.

In the case of a corresponding chain drive geometry in which the number of links is smaller than the tooth number, it is therefore necessary to set the ratio of the tooth number of the driven chain sprocket to the sum of all chain links to an odd number, for example, by a suitable local mounting of the markers or by the coordinated construction of the chain sprocket toothing. As a result, after a specific number of chain circulations, each chain link enters into the free course and is situated there at the point in time of at least one measurement. An individual-link damage can therefore be detected.

This may also be achieved by mounting a plurality of spaced markers, in which case a higher resolution is achieved during the measurement, which results in a higher probability of finding an individual defect. However, at the same time, it must be ensured that the signals can be distinguished from one another. Thus, in the case of a lagging of the driven chain sprocket caused by a lengthening of the chain because of an excessively narrow spacing of the markers, replacement of defect signals by regular signals, which report no wear of the chain, is prevented. The selection of a suitable distance between the markers is therefore required. As an alternative, it is also possible to use markers which differ from one another by their designs, so that different, and therefore distinguishable, signals are generated when the markers are situated close to one another.

As an alternative to the above-described embodiment, with respect to the signal processing, pattern recognition may also be used in connection with the detection of the phase relations per at least one chain circulation. In such an arrangement the actual detected course pattern of the sequence of the phase relations per crankshaft rotation (FIG. 3) is compared with a predetermined pattern of the phase relations, which may be stored in an electronic memory of the signal processing system 40. The predetermined pattern corresponds to a particular degree and type of wear so that, in the case of repeated correspondence of the predetermined pattern and the actual sequence pattern, a signal can be emitted which—according to the respective predetermined pattern —can be assigned to a certain degree and type of wear. Thus, by means of this signal processing and analysis, conclusions can be drawn not only concerning the quality of the wear (the wear of the individual link or the overall chain lengthening), but also concerning the wear condition, that is, the intensity of the wear. For this purpose, a plurality of predetermined patterns can be stored in an electronic memory of the signal processing 40, compared with the pattern of the actual value sequence. In a relatively simple manner, it is thus possible in this case to detect damage to several individual links in a timing chain 8.

In practice, a change of rotational speed or load causes the level of the phase relation to be displaced because of the expansion of the chain 8 as a result of the changing pulling moment due to the changing of the conductor track curve. Also, the engine temperature affects the expansion of the timing chain 8. However, by comparing the measured values and the values of an electronically stored characteristic desired value diagram, which are selected as a function of current instantaneous engine operating parameters, such displacements of the phase relation may be compensated mathematically. In this manner signals are generated for the analysis which permit the derivation of clear information as to whether a chain damage or a chain wear exists with respect to a lengthening of the chain 8.

The monitoring of the wear by means of the diagnostic device according to the invention may take place permanently, that is, over the whole load and rotational speed range during the engine and/or driving operation. It would be conceivable to monitor the wear of the timing chain 8 in a simple manner without any additional comparison of the phase relation values with a characteristic diagram only during constant engine conditions, particularly in idling phases.

Although the invention has been described and illustrated in detail, it is to be clearly understood that the same is by way of illustration and example, and is not to be taken by way of limitation. The spirit and scope of the present invention are to be limited only by the terms of the appended claims.

What is claimed is:

1. Method for evaluating wear of a continuously circulating chain in a chain circuit of an engine, comprising the steps of:

measuring relative phase of two sprockets in said chain circuit at a plurality of positions of said chain during at least a circulation of said chain in said chain circuit;

comparing measured relative phase values with a predetermined desired value to generate a series of deviation values;

comparing said deviation values to detect variations thereof during said at least a circulation of said chain in said chain drive circuit; and determining a type of wear of said chain as a function of said variations.

2. Method according to claim 1, wherein said continuously circulating chain is a timing chain of a motor vehicle engine.

3. Method according to claim 1, wherein the actual relative phase of signals is determined continuously.

4. Method according to claim 1, wherein the actual relative phase of the signals is determined only in the case of constant engine operating conditions.

5. Method according to claim 1, wherein position generators existing on the engine are used as sensors for measuring said relative phase of the chain sprockets.

6. Method according to claim 1, further comprising the step of:

in the case of a constant deviation of measured relative phase values from the desired value during a timing chain circulation, generating a signal which indicates an approximately uniform lengthening of the timing chain and an unacceptably high wear of the overall chain.

7. Method according to claim 1, wherein a signal is generated which, in the case of a deviation of the current actual relative phase relation value, indicates an unacceptable lenghthening of the timing chain.

8. Method according to claim 1, wherein a signal indicative of said predetermined desired value is stored in an electronic memory.

9. Method according to claim 1, wherein said step of measuring relative phase is performed independently of the rotational engine speed by measuring time between an arrival of a signal triggered by a fist sensor and an immediately following signal triggered by a second sensor as well as a period duration T of a signal from said second sensor in which the respective measuring period is situated;

determining a ratio of said measured time to the respective pertaining period duration T whose value indicates the respective phase relation.

10. Method according to claim 1, wherein said determining step comprises:

determining an approximately uniform lengthening of the chain and an unacceptably high wear of the overall chain when said deviations are substantially constant at a level above a predetermined value; and determining an unacceptable lengthening of a portion of said chain due to damage to individual links when single or multiple discrete deviations occur which are not substantially constant.

11. Diagnostic device for monitoring wear of a continuously circulating chain in a chain drive of an engine which, from a crankshaft drives at least one camshaft and in the course of the chain drive engages in the teeth of at least two mutually spaced chain sprockets, said device having a sensor positioned adjacent a chain sprocket and having a signal processing unit to which the sensor emits signals in interaction with the chain drive, the signal processing device comparing the signals with a desired value signal and, when there is a deviation from this signal, emitting a signal indicative of unacceptable wear in the form of an unacceptable lengthening of the chain, wherein:

an engine-integrated diagnostic device monitors wear of the chain during engine operation in a no contact manner;

the diagnostic device contains at least two sensors arranged on different chain sprockets;

at least one marker is mounted on each of the respective chain sprockets, which marker triggers a sensor signal in one of said sensors at least once per rotation of the respective chain sprocket, said signal representing an angular position of the chain sprockets with respect to one another;

the signal processing device contains means for determining a phase relation of the received sensor signals with respect to one another, means for performing a desired value comparison with respect to the phase relation, and a signal generator which, when the phase relation deviates from the predetermined desired value, emits a signal reporting a lengthening of the timing chain; and a function module integrated into the signal processing device determines maximal and minimal values from a value sequence of all phase relations sensed in the detection per at least one chain circulation and, for each respective value sequence, forms the difference between the maximal and minimal values.

12. Diagnostic device according to claim 11, wherein the at least one marker is mounted on the face of the chain sprockets.

13. Diagnostic device according to claim 11, wherein said at least two sensors are position generators, which exist on the engine, for the determination of the position of the crankshaft and of a camshaft.

14. Diagnostic device according to claim 11, wherein;

at least one marker is formed by a projection made of a magnetizable material which projects away from the respective chain sprocket; and at least two sensors are each formed by a stationary induction generator arranged in proximity to a circle of movement described by the projection and which, when the projection passes by, supplies a signal which can be electronically data processed.

15. Diagnostic device according to claim 11, wherein a plurality of narrowly spaced markers are mounted on the chain sprockets and are designed such that the signals generated in the interaction with the sensor can be distinguished.

16. Diagnostic device according to claim 11, wherein the desired value comparison compares the differential value with a desired value for assessing a possible individual-link damage.

17. Diagnostic device according to claim 11, wherein the desired value comparison compares the maximal value with a desired value for assessing a possible unacceptably high overall chain wear.

18. Diagnostic device according to claim 11, wherein the diagnostic device has and indication which can be activated for the exterior recognition of an unacceptable timing chain wear by the signal generator by way of the signal reporting a lengthening of the timing chain.

19. Diagnostic device according to claim 11, wherein the signal processing device contains an electronic memory in which the signal can be stored which was emitted by the signal generator and reports a lengthening of the timing chain.

20. Method for monitoring wear of a continuously circulating chain of an engine by comparing signals from a chain sprocket of a chain drive circuit indicative of running of the chain in said circuit, with a predetermined desired value, and recognizing an unacceptable wear of said chain in the form of an unacceptable lengthening of the chain, when there is a deviation from this desired value, said method comprising the steps of:

during engine operation, determining an actual relative phase relation between signals of two engine-integrated on-board sensors which detect angular position of different chain sprockets of the chain drive circuit;

comparing said actual relative phase relation with a predetermined desired value; and if the actual phase relation deviates from the desired value, generating a signal which indicates an unacceptable lengthening of the timing chain;

wherein said step of generating a signal comprises:

in the case of a singular or multiple, but not permanent occurrence of a deviation of the actual relative phase relation from the desired value during a timing chain circulation, generating a signal which indicates an unacceptable lengthening of the timing chain due to damage to an individual link.

21. Method for monitoring wear of a continuously circulating chain of an engine by comparing signals from a chain sprocket of a chain drive circuit indicative of running of the chain in said circuit, with a predetermined desired value, and recognizing an unacceptable wear of said chain in the form of an unacceptable lengthening of the chain, when there is a deviation from this desired value, said method comprising the steps of:

during engine operation, determining an actual relative phase relation between signals of two engine-integrated on-board sensors which detect angular position of different chain sprockets of the chain drive circuit;

comparing said actual relative phase relation with a predetermined desired value; and if the actual phase relation deviates from the desired value, generating a signal which indicates an unacceptable lengthening of the timing chain;

wherein all phase relations are detected within at least one circulation of said chain in said chain drive circuit, forming a sequence of values; and wherein the sequence of values is compared with a desired value, and an approximately permanent falling of the values below the desired value is indicative of an unacceptably high overall chain wear.

22. Method for monitoring wear of a continuously circulating chain of an engine by comparing signals from a chain sprocket of a chain drive circuit indicative of running of the chain in said circuit, with a predetermined desired value, and recognizing an unacceptable wear of said chain in the form of an unacceptable lengthening of the chain, when there is a deviation from this desired value, said method comprising the steps of:

during engine operation, determining an actual relative phase relation between signals of two engine-integrated on-board sensors which detect angular position of different chain sprockets of the chain drive circuit;

comparing said actual relative phase relation with a predetermined desired value; and if the actual phase relation deviates from the desired value, generating a signal which indicates an unacceptable lengthening of the timing chain;

wherein all phase relations are detected within at least one circulation of said chain in said chain drive circuit, forming a sequence of values; and wherein said step of generating a signal comprises:
determining a maximal and a minimal value from said sequence of values;
determining a difference between the maximal and minimal values;
comparing said difference with a desired value; and
generating a signal indicative of an exceeding of the difference above this desired value as a signal for an unacceptably high individual-link wear.

23. Method for monitoring wear of a continuously circulating chain of an engine by comparing signals from a chain sprocket of a chain drive circuit indicative of running of the chain in said circuit, with a predetermined desired value, and recognizing an unacceptable wear of said chain in the form of an unacceptable lengthening of the chain, when there is a deviation from this desired value, said method comprising the steps of:

during engine operation, determining an actual relative phase relation between signals of two engine-integrated on-board sensors which detect angular position of different chain sprockets of the chain drive circuit;

comparing said actual relative phase relation with a predetermined desired value; and if the actual phase relation deviates from the desired value, generating a signal which indicates an unacceptable lengthening of the timing chain;

wherein all phase relations are detected within at least one circulation of said chain in said chain drive circuit, forming a sequence of values; and wherein said step of generating a signal comprises:
comparing the sequence of values with a predetermined value sequence pattern indicating a specific wear condition of the timing chain; and
in the case of a periodically repeated correspondence of the value sequence and the pattern, emitting a signal which indicates a type or degree of the wear of the timing chain according to the wear condition contained in the pattern.

24. Method according to claim 13, wherein the value sequence is stored electronically and is compared with the value sequence pattern filed in an electronic memory.

25. Diagnostic device for monitoring wear of a continuously circulating chain in a chain drive of an engine which, from a crankshaft drives at least one camshaft and in the course of the chain drive engages in the teeth of at least two mutually spaced chain sprockets, said device having a sensor positioned adjacent a chain sprocket and having a signal processing unit to which the sensor emits signals in interaction with the chain drive, the signal processing device comparing the signals with a desired value signal and, when there is a deviation from this signal, emitting a signal indicative of unacceptable wear in the form of an unacceptable lengthening of the chain, wherein:

an engine-integrated diagnostic device monitors wear of the chain during engine operation in a no contact manner;

the diagnostic device contains at least two sensors arranged on different chain sprockets;

at least one marker is mounted on each of the respective chain sprockets, which marker triggers a sensor signal in one of said sensors at least once per rotation of the respective chain sprocket, said signal representing an angular position of the chain sprockets with respect to one another;

the signal processing device contains means for determining a phase relation of the received sensor signals with respect to one another, means for performing a desired value comparison with respect to the phase relation, and a signal generator which, when the phase relation deviates from the predetermined desired value, emits a signal reporting a lengthening of the timing chain; and the signal processing device contains means for performing a pattern recognition which compares detected value sequence of the phase relations with a predetermined value sequence pattern indicating a specific wear condition of the timing chain; and in the case of a periodically repeated correspondence of the value sequence and the pattern the signal processing unit emits a signal reporting type or the degree or the wear of the timing chain according to the wear condition contained in the pattern.

26. Diagnostic device according to claim 25, wherein the signal processing device contains an electronic memory unit in which the value sequence pattern is stored, and the respective determined value sequence of the phase relations for a comparison with the pattern can also be stored in an electronic memory.

27. A method of detecting deformation of a chain which circulates continuously about at least two sprockets in an engine, said method comprising the steps of:

measuring a rotational relative phase relation of said first and second sprockets while said engine is running;

repeating said measuring step for a plurality of iterations during at least a complete circulation of said chain on said sprockets, whereby a series of measured values is generated;

determining minimum and maximum values from among measured values in said series of measured values;

determining a difference between said maximum and minimum values;

comparing said difference with a predetermined value; and when said difference exceeds said predetermined value, generating a signal indicative of excessive wear of a portion of said chain.

28. A method of detecting deformation of a chain which circulates continuously about at least two sprockets in an engine, said method comprising the steps of:

measuring a rotational relative phase relation of said first and second sprockets while said engine is running;

repeating said measuring step for a plurality of iterations during at least a complete circulation of said chain on said sprockets, whereby a series of measured values is generated;

determining a maximum value from among measured values in said series of measured values;

comparing said maximum value with a predetermined value; and when said maximum value exceeds said desired value, generating a signal indicative of excessive overall chain wear.

29. Apparatus for monitoring wear of a chain which circulates continuously about at least first and second sprockets in an engine, comprising:

a first sensor for generating a first signal indicative of rotational position of said first sprocket;

a second sensor for generating a second signal indicative of rotational position of said second sprocket;

means for comparing said first and second signals to determine a relative rotational phase relation of said first and second sprockets at a plurality of points within at least a complete circulation of said chain on said sprockets, whereby a series of measured values is generated;

means for determining minimum and maximum values from among measured values in said sequence of measured values;

means for determining a difference between said minimum and maximum values;

means for comparing said difference with a predetermined value; and means for generating a signal indicative of excessive wear of a portion of said chain whenever said difference exceeds said predetermined value.

30. Apparatus for monitoring wear of a chain which circulates continuously about at least first and second sprockets in an engine, comprising:

a first sensor for generating a first signal indicative of rotational position of said first sprocket;

a second sensor for generating a second signal indicative of rotational position of said second sprocket;

means for comparing said first and second signals to determine a relative rotational phase relation of said first and second sprockets at a plurality of points within at least a complete circulation of said chain on said sprockets, whereby a series of measure values is generated;

means for determining a maximum value from among said series of measured values;

means for comparing said maximum value with a predetermined value; and means for generating a signal indicative of excessive overall chain wear when said maximum value exceeds said predetermined value.

* * * * *